April 16, 1940.    L. S. SMITH    2,197,162
BORING TOOL
Filed Jan. 26, 1939
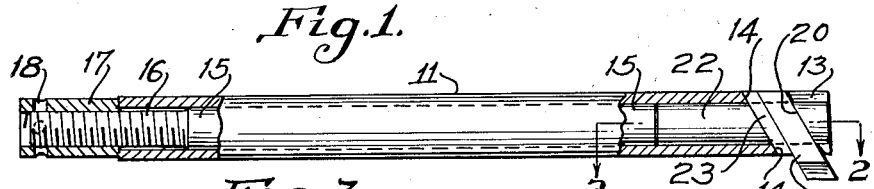
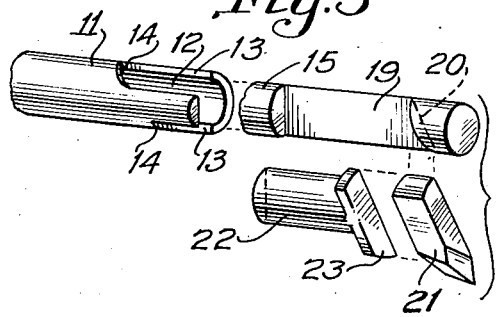
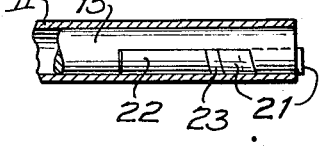
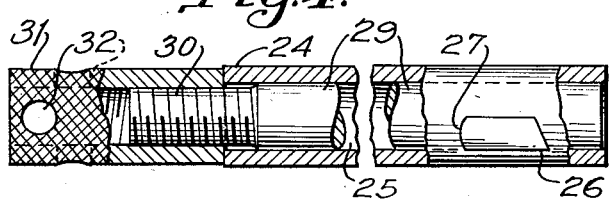
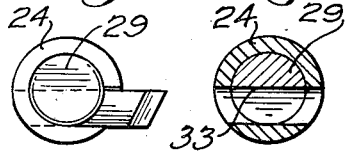
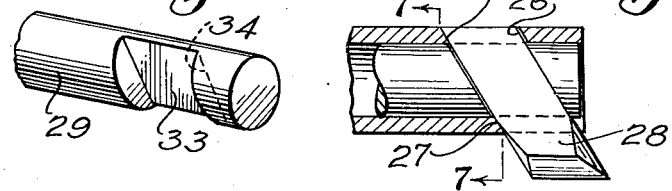
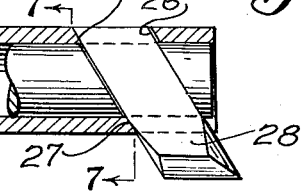
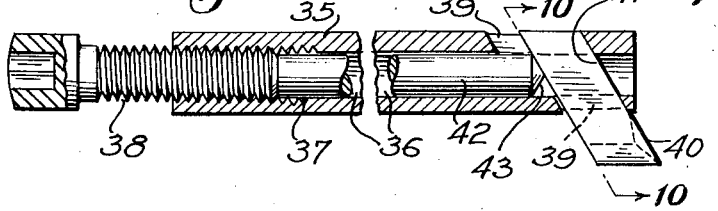
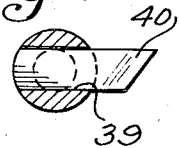
INVENTOR.
LUCIAN S. SMITH
BY Victor J. Evans & Co.
ATTORNEYS.

Patented Apr. 16, 1940

2,197,162

UNITED STATES PATENT OFFICE 2,197,162

BORING TOOL

Lucian S. Smith, Los Angeles, Calif.

Application January 26, 1939, Serial No. 252,978

1 Claim. (Cl. 77—58)

This invention relates to machine tools and more especially to boring tools for lathes.

An object of this invention is to provide a simple, practical and efficient tool of the character described.

Another object is to provide an inexpensive boring tool adapted for cutting small diameters and having replaceable bits securely held therein.

Other objects and advantages will appear and be brought out more fully in the following specification, reference being had to the accompanying drawing, wherein Fig. 1 is a bottom view partly broken away, of an embodiment of my invention.

Fig. 2 is a sectional view taken along the line 2—2 of Fig. 1.

Fig. 3 is an exploded view of the end portion of the tool as shown in Fig. 1.

Fig. 4 is a rear view, partly in section, of a modified form of the invention.

Fig. 5 is a bottom view, in section, of the end portion of the tool of Fig. 4.

Fig. 6 is an end view of the tool of Fig. 4.

Fig. 7 is a sectional view taken along the line 7—7 of Fig. 5.

Fig. 8 is a perspective view of the end portion of the lock rod of Figs. 4 to 7.

Fig. 9 is a bottom view, in section, of a further modified form of the invention, and Fig. 10 is a sectional view taken along the line 10—10 of Fig. 9.

Referring more particularly to the drawing, I show a boring tool having tubular shank 11 having a bore 12 and provided with a slot 13 in one end thereof, there being a seat portion 14 cut at an angle at the end of slot 13. A locking rod 15 is provided for a snug fit in bore 12 and has a threaded portion 16 to receive a threaded lock screw 17 which is adapted to draw the rod 15 to the left as seen in Fig. 1, as lock screw 17 tightens against the end of shank 11. Lock screw 17 may be knurled or provided with apertures 18 for a radial tightening tool.

The forward end of rod 15 is provided with a recess 19 extending to substantially the center thereof, and an angular shoulder 20 is formed at the forward end of this recess, against which a tool bit 21 is adapted to rest. A wedge block 22 corresponding substantially to the shape of recess 19 is provided with an angular flange 23 which rests against the side of tool 21 and against seat 14.

Fig. 1 illustrates the assembly of the tool, from which it will be clear that the bit 21 and block 22 may be assembled in recess 19, the ends of bit 21 and flange 23 extending through slot 13, and when the lock screw 17 is screwed down, shoulder 20 will press against bit 21, which in turn will press against flange 23, which in turn will be pressed and held against seat 14, and the assembly will be tightly held together for the boring operations.

In Figs. 4 to 8 I show a modified form of the invention which comprises a tubular shank 24, having a bore 25 provided with an angular aperture 26, which aperture has abutment portions 27 for a tool bit 28. A lock rod 29 adapted to fit bore 25 is provided with a threaded portion 30 for a lock screw 31, having apertures 32 for a radial tightening tool.

Rod 29 is provided with a recess 33 having an angular shoulder 34 for holding one side of bit 28 when the rod is screwed down, the bit 28 being pressed and held against abutments 27 of shank 24.

In Figs. 9 and 10 I show a further modified form of the invention wherein a tubular shank 35 is provided with a bore 36 and a threaded portion 37 for a threaded lock screw 38. An angular slot 39 is adapted to receive a boring bit 40 and has an abutment portion 41 against which the bit 40 is held by pressure from a lock pin 42 in bore 36, which is tightened by a lock screw 38. Pin 42 is preferably provided with a tapered end portion 43, the taper of which corresponds to the angle of slot 39.

From the foregoing description it will be apparent that I have provided improved, novel boring tools which are simple and inexpensive to manufacture, and adapted for interchangeability of the bits, and which may be readily assembled and disassembled. In the forms shown in Figs. 1 to 8 it will be seen that the cutting edges of the bits are on the center line of the boring tool which is advantageous, as is obvious to those skilled in the art.

Having described my invention, what I claim is:

A boring tool as described, comprising a shank having a bore, a bit slot in one end of said shank and having a shoulder, a lock rod in said bore adapted to press the tool bit against said shoulder, a screw for moving said rod in the shank, said lock rod having a recess for a bit in one side, and a wedge block within the recess in the lock rod and conforming to the shape of the lock rod, and said wedge block having an angular flange extending into the slot in the shank and adapted to engage said bit, whereby the wedge block is maintained in the shank when the tool is removed.

LUCIAN S. SMITH.